O. G. LEE.
HAT PIN POINT PROTECTOR.
APPLICATION FILED DEC. 9, 1911.
1,029,379.
Patented June 11, 1912.
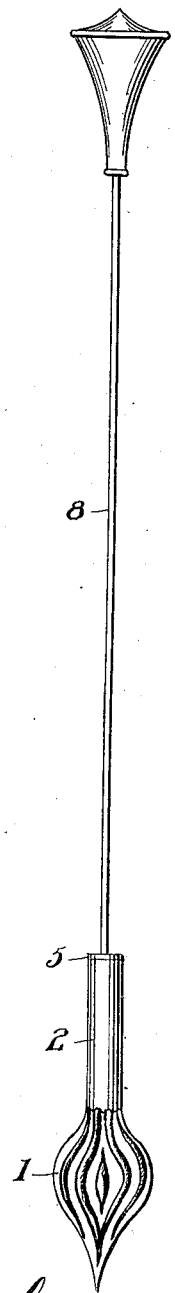
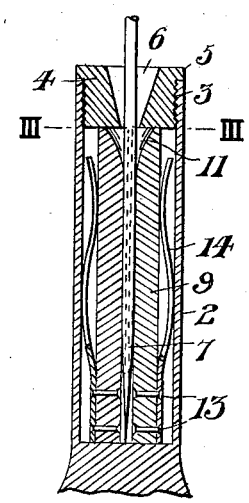
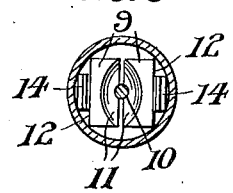
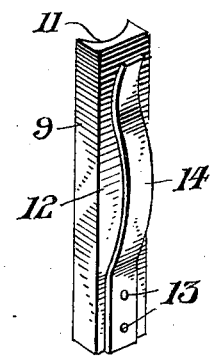
WITNESSES
INVENTOR
Oscar G. Lee
BY
ATTORNEYS

UNITED STATES PATENT OFFICE.

OSCAR G. LEE, OF JACOBS CREEK, PENNSYLVANIA.

HAT-PIN-POINT PROTECTOR.

1,029,379. Specification of Letters Patent. Patented June 11, 1912.

Application filed December 9, 1911. Serial No. 664,827.

*To all whom it may concern:*

Be it known that I, OSCAR G. LEE, a citizen of the United States of America, residing at Jacobs Creek, in the county of Westmoreland and State of Pennsylvania, have invented certain new and useful Improvements in Hat-Pin-Point Protectors, of which the following is a specification, reference being had therein to the accompanying drawing.

This invention relates to a hatpin point protector and lock, and the objects of my invention are, first, to provide a device that can be easily and quickly manipulated upon the pointed end of a pin for protecting the same and preventing pedestrians from being injured by contacting with the pin; second, to provide a device of the above type that will serve as a lock for preventing accidental displacement of the pin relatively to a hat; third, to provide a hatpin point protector consisting of comparatively few parts easily assembled and renewed, and fourth, to accomplish the above results by a mechanical construction that is simple, inexpensive to manufacture, and susceptible to any desired ornamentation.

With the above and other objects in view, the invention resides in the novel construction, combination and arrangement of parts to be hereinafter specifically described and then claimed.

Reference will now be had to the drawing, wherein:—

Figure 1 is a side elevation of the hatpin point protector and lock, Fig. 2 is an enlarged longitudinal sectional view of a portion of the protector, Fig. 3 is a horizontal sectional view of a portion of the protector, taken on the line III—III of Fig. 2, and Fig. 4 is a perspective view of one of the locking members of the device.

A device in accordance with this invention comprises an ornamental head 1 having a sleeve or cylindrical casing 2, said casing having the walls thereof screw threaded, as at 3 to receive a plug 4 having a peripheral flange 5. The plug 5 has a central tapering opening 6 providing an entrance for the pointed end 7 of a hatpin 8.

Arranged within the sleeve or casing 2 are oppositely disposed locking members 9 having the confronting faces thereof curved, as at 10. The grooves 10 are flared or enlarged, as at 11 adjacent to the entrance opening 6, whereby the pointed end 7 of the pin 6 can readily pass into said grooves.

The locking members 9 are rectangular in cross section and have flat outer faces 12. Secured to these faces by rivets or other fastening means 13 are the inner ends of flat compression springs 14, said springs engaging the inner walls of the sleeves or casings 2 and retaining said locking members normally together.

The locking device can be made of light and durable metal and the sleeve or casing 2 thereof suitably ornamented.

What I claim is:—

A hat pin point protector comprising the combination with a head, of a cylindrical sleeve integral therewith and projecting from the inner end thereof, said sleeve open at its inner end and provided at the said end with interior threads, a plug formed of two different diameters, that portion of the smaller diameter provided with peripheral threads and engaging with the threads of said sleeve, that portion of the larger diameter abutting against the inner edge of the sleeve, said plug formed with a tapering opening, a pair of rectangular oppositely disposed locking members positioned in said sleeve and extending from the plug to the head, each of said members having its inner face grooved and its outer face flat, the ends of the grooves opposing the inner face of the plug flared, and springs of ogee curvature interposed between the flat face of said member and the inner face of the sleeve for retaining said members normally closed and in engagement with the pointed end of a hat pin, each of said springs having one end fixedly secured to one end of a locking member.

In testimony whereof I affix my signature in the presence of two witnesses.

OSCAR G. LEE.

Witnesses:
N. E. RHOADES,
DONALD O. RHOADES.

Copies of this patent may be obtained for five cents each, by addressing the "Commissioner of Patents, Washington, D. C."